United States Patent
Ito

(10) Patent No.: US 8,503,779 B2
(45) Date of Patent: Aug. 6, 2013

(54) METHOD, APPARATUS, AND MEDIUM USED IN PROCESSING AN IMAGE IN A UNIT OF A GENERATED BAND AREA, THE HEIGHT OF WHICH IS DETERMINED BASED ON A TRANSFER AMOUNT AND TRANSFER UNIT IMAGE DATE

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 512 days.

(21) Appl. No.: 12/775,995

(22) Filed: May 7, 2010

(65) Prior Publication Data

US 2010/0296732 A1 Nov. 25, 2010

(30) Foreign Application Priority Data

May 22, 2009 (JP) ................................. 2009-124720

(51) Int. Cl.
 *G06K 9/34* (2006.01)
(52) U.S. Cl.
 USPC ........................................................ 382/173
(58) Field of Classification Search
 None
 See application file for complete search history.

(56) References Cited

U.S. PATENT DOCUMENTS

| | | | | |
|---|---|---|---|---|
| 6,587,158 | B1 | 7/2003 | Adams et al. | 348/716 |
| 6,950,559 | B2 | 9/2005 | Kobayashi | 382/260 |
| 8,018,465 | B2 * | 9/2011 | Carson et al. | 345/522 |
| 2009/0033766 | A1 | 2/2009 | Ito | 348/231.2 |
| 2009/0161954 | A1 * | 6/2009 | Inoue et al. | 382/173 |
| 2012/0237133 | A1 * | 9/2012 | Jeong | 382/236 |

FOREIGN PATENT DOCUMENTS

| | | | |
|---|---|---|---|
| JP | 2000-312327 | A | 11/2000 |
| JP | 3733826 | B2 | 1/2006 |
| JP | 2006-139606 | A | 6/2006 |

* cited by examiner

*Primary Examiner* — Nirav G Patel
(74) *Attorney, Agent, or Firm* — Fitzpatrick, Cella, Harper & Scinto

(57) ABSTRACT

A method and apparatus is used in processing an image in a unit of a band area by dividing image data of a target image into a plurality of band areas, when processing image data by referring to reference data. The method includes and the apparatus performs the steps of setting a first transfer unit of the image data, obtaining a second transfer unit of the reference data to process the image data in the first transfer unit, determining a first transfer amount of the image data based on the obtained second transfer unit of the reference data so that both of the image data and the reference data can be buffered in a buffer used in image processing, and determining a height of a band area to be generated, based on the first transfer amount and the first transfer unit of the image data.

12 Claims, 17 Drawing Sheets

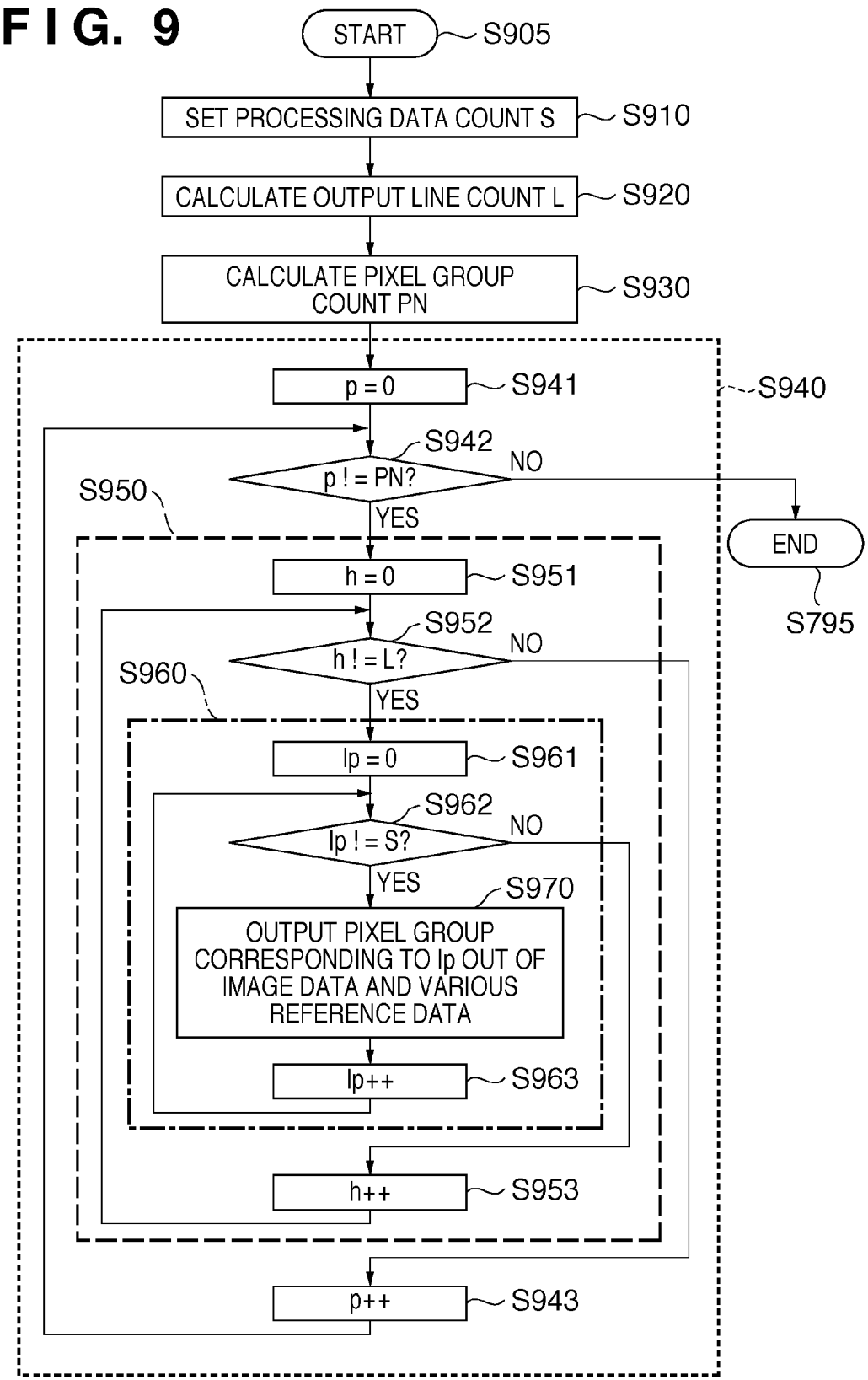

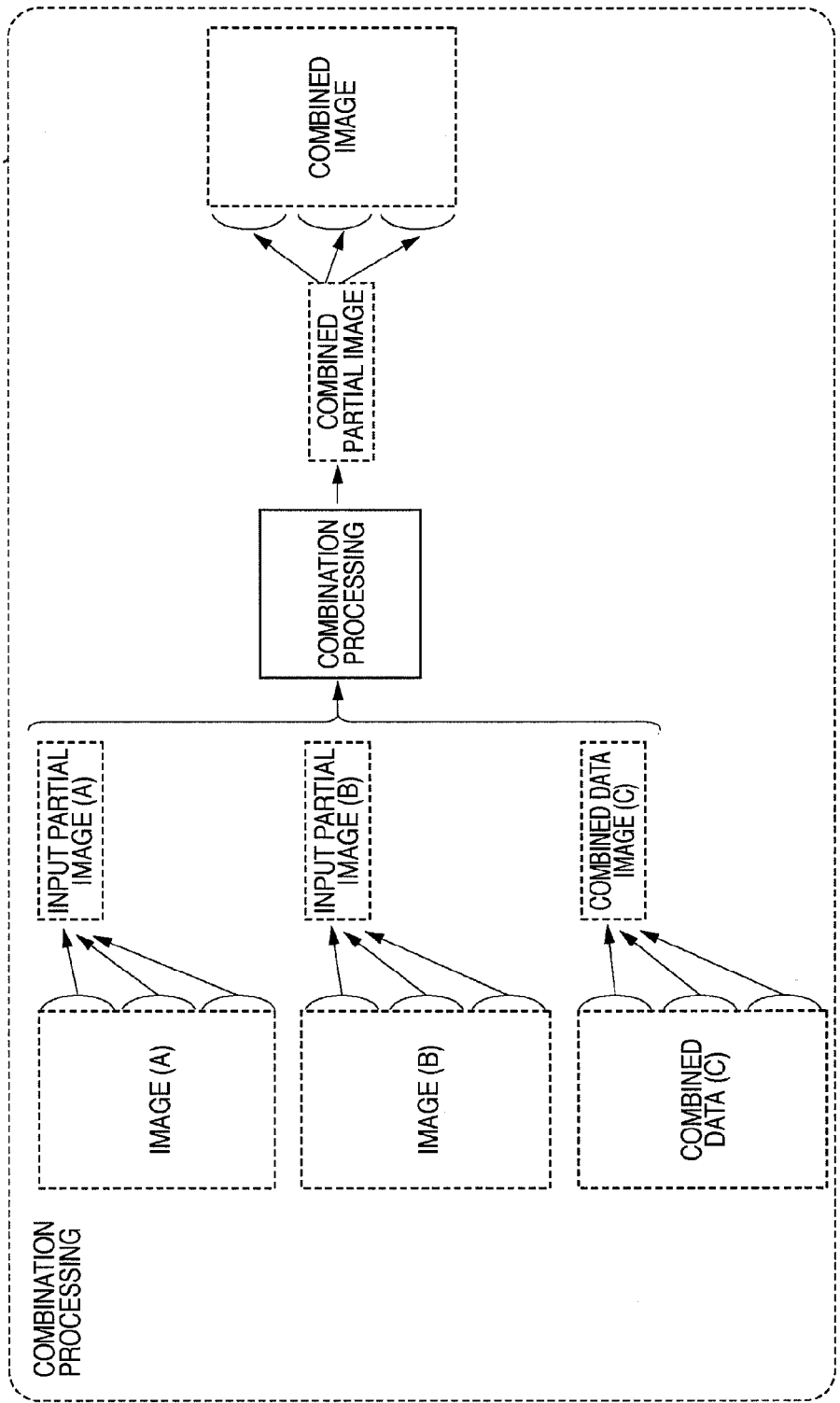

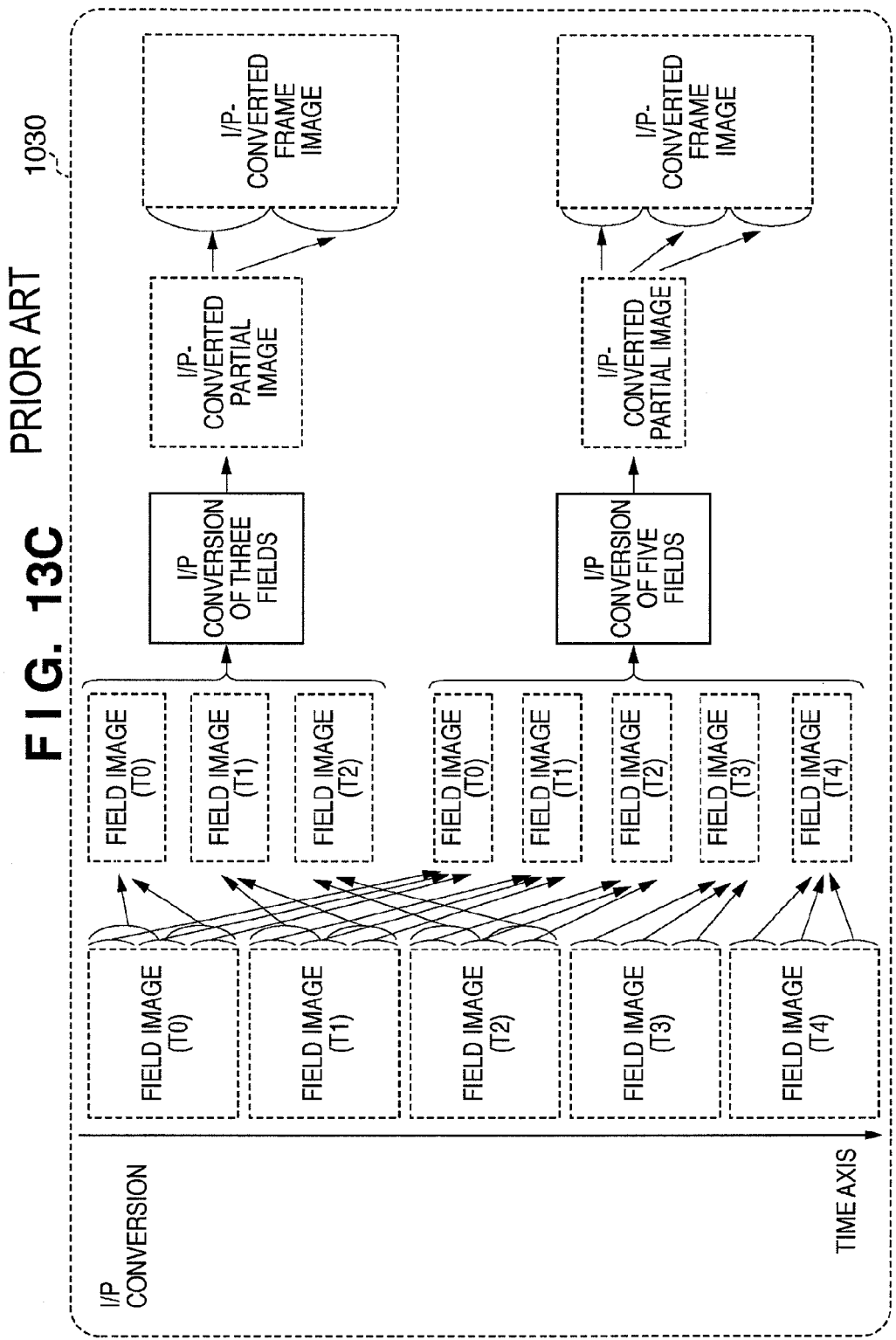

METHOD, APPARATUS, AND MEDIUM USED IN PROCESSING AN IMAGE IN A UNIT OF A GENERATED BAND AREA, THE HEIGHT OF WHICH IS DETERMINED BASED ON A TRANSFER AMOUNT AND TRANSFER UNIT IMAGE DATE

BACKGROUND OF THE INVENTION

1. Field of the Invention

The present invention relates to an image processing method, image processing apparatus, and program. Particularly, the present invention is suitably applied when handling a plurality of image data, correction data, and the like in a main memory for image processing by dividing them, and sequentially reading out necessary data to perform image processing and correction processing.

2. Description of the Related Art

Conventionally, local or neighbor image processing such as spatial filtering is done when forming an image. Local image processing is image processing which executes any calculation using all pixels falling within a spatial filtering region including a pixel to be processed. In the following description, a pixel to be processed will be simply referred to as a pixel of interest.

For example, spatial filtering, such as edge enhancement processing or blur processing, is performed for digital image data 300 in FIG. 11. As a conventional technique for the local image processing, digital image data is divided into areas and local image processing is executed in a unit of area created by division (see U.S. Pat. No. 6,587,158, Japanese Patent Laid-Open No. 2000-312327, Japanese Patent No. 3733826, and Japanese Patent Laid-Open No. 2006-139606).

According to this technique, one entire digital image data 300 is generally divided in a band-like or strip shape, as shown in 11a to 11d of FIG. 11. The respective areas sequentially undergo various kinds of image processes. The elongated area created by division is called a band area. A storage area where the band area is rendered is called a band memory. Processing of dividing an image is called band division. The band memory is not always reserved as a storage area in the main memory and may be reserved in any storage area in the system. In the following description, however, the band memory is reserved in the main memory for descriptive convenience.

As the coordinate system (main scanning direction—sub-scanning direction) of digital image data, a new coordinate system (band area coordinate system) based on the directions of length and height is defined and expresses the band area by (length Bdl×height Bdh). When dividing an image into bands in the sub-scanning direction, the band area is represented by (length Bdl×height Bdh), as shown in 11e of FIG. 11. When dividing an image into bands in the main scanning direction, the band area is represented by (length Bdl×height Bdh), as shown in 12a to 12d of FIG. 12.

More specifically, the length Bdl of the band area takes the value of either the width of digital image data in the main scanning direction or the height in the sub-scanning direction. The band height takes an arbitrary value.

Band processing will be explained in more detail using the example of FIG. 11. This also basically applies to FIG. 12, and a repetitive description will be omitted.

A first band area 301 shown in 11a of FIG. 11 is rendered in the band memory in the main memory and undergoes image processing. Then, a second band area 302 shown in 11b of FIG. 11 is rendered and overwritten in the band memory where the first band area 301 has been rendered, and undergoes image processing. Further, a third band area 303 shown in 11c of FIG. 11 is rendered and overwritten in the band memory where the second band area 302 has been rendered, and undergoes image processing. Finally, a fourth band area 304 shown in 11d of FIG. 11 is rendered and overwritten in the band memory where the third band area 303 has been rendered, and undergoes image processing. As is apparent from 11a to 11d of FIG. 11, the band areas 301 to 304 have the same length, but their heights need not always been equal. The height of the band memory serving as a storage area reserved in the main memory is determined by a band area largest in size in the direction of height (first to third band areas 301 to 303 in the example of FIG. 11). The explanation of FIG. 11 also applies to the example of FIG. 12 except that the band division count is three.

According to this technique, respective band areas are designed to partially overlap each other at the boundaries between adjacent areas in order to perform local image processing without any gap between the band areas. In Japanese Patent Laid-Open No. 2006-139606, an additional pixel is scanned in the same direction as the height of each band area. The capacity of a delay memory that holds a pixel of interest necessary for local image processing is defined by the height of each band area, thereby reducing the capacity of the delay memory.

In the field of image processing methods and apparatuses, however, there are many image processes which cannot be dealt with by considering only local or neighbor image processing such as spatial filtering described in U.S. Pat. No. 6,587,158, Japanese Patent Laid-Open No. 2000-312327, Japanese Patent No. 3733826, and Japanese Patent Laid-Open No. 2006-139606. Such image processing will be exemplified with reference to FIGS. 13A to 13C.

An example is correction processing 1010 to correct the individual differences between the reading elements of a sensor device for an image read by an image reading apparatus such as a scanner, as shown in FIG. 13A. Pieces of information necessary in the correction processing 1010 are, for example, minimum read value data and maximum read value data for each reading element of the sensor device. Based on these pieces of information, a target read image is corrected by calculation using equation (1) for each pixel data (pixel value):

$$X=(P-\text{MIN})/(\text{MAX}-\text{MIN})\times 1023 \quad (1)$$

where X is a corrected pixel value (X for a 10-bit digital signal), P is a read pixel value, MIN is a minimum read value, and MAX is a maximum read value.

That is, data necessary in the correction processing 1010 are three different types of information, i.e., minimum value data, maximum value data, and pixel data of a read image that change for each pixel. When the sensor device of the scanner is a line sensor having a line of reading elements corresponding to respective pixels, the sensor moves in the sub-scanning direction to read a two-dimensional image. In this reading method, minimum value data and maximum value data, which change for each pixel, are aligned in the main scanning direction. In the sub-scanning direction, the same minimum value data and maximum value data are aligned for pixels at the same main scanning position.

Correction processing similar to the above-described one is one for a two-dimensional display device used in a flat-screen television such as a liquid crystal television or plasma television. In the two-dimensional display device, the individual differences between two-dimensionally spread display elements change. Thus, correction processing is executed using two-dimensional correction data, instead of one-dimensional correction data in the correction processing 1010. This correction processing needs to pay attention to the repetitive method of correction data because the repetitive method changes depending on the device shape (corresponding to a method of spreading elements).

Another example is combination processing 1020 to combine a plurality of rendering images in accordance with combination data (a value), as shown in FIG. 13B. When two rendering images are to be combined, the combination processing 1020 is done for each pixel using a combination equation like the following equation (2):

$$X = P2 \times A + P1 \times (1024 - A) \qquad (2)$$

where X is a combined pixel value (when the α value is given by a 10-bit digital signal), P1 is the pixel value of the first rendering image, P2 is that of the second rendering image, and A is the α value of each pixel of combined data. Note that the combined data (α value) may be equal for all the pixels of a rendering image, or may be two-dimensional combined data (α value) which changes for each pixel of a rendering image.

For the latter combined data (α value), when the number of rendering images to be combined is N, the numbers of pixel data necessary for processing and the number of combined data (α value) differ from those in the foregoing example in the combination processing 1020.

In some cases, adaptive spatial filtering is done by referring to a plurality of field images which are successive along the time axis, like interlaced/progressive conversion (to be simply referred to as I/P conversion 1030) of a moving image, as shown in FIG. 13C. Generally in image processing referring to a plurality of field images, like the I/P conversion 1030, high-quality image processing can be achieved by adaptive processing using a larger number of field images.

A plurality of field images are generally stored in an external memory such as a low-cost DRAM connected to a semiconductor chip (e.g., ASIC) on which an image processing circuit is mounted. In every I/P processing, therefore, a plurality of field images need to be read out from the external memory and input to the I/P conversion circuit. Owing to a limitation on product cost, most external memories have a limitation on the memory band permissible when reading out a plurality of field images from the external memory. It is impossible to read out field images having high resolution such as full high vision resolution (1920×1080i), and execute I/P conversion without any limit.

Assume that there is an image processing apparatus with a memory band capable of reading out, for example, up to three field images having the full high vision resolution. Apparently, when I/P-converting a moving image having low resolution like the NTSC resolution (720×480i), this image processing apparatus can achieve high-quality I/P conversion by referring to a larger number of field images than those of a moving image having the full high vision resolution.

In the I/P conversion 1030, it is important to flexibly switch the image processing method in accordance with the resolution and reference field count in order to perform image processing at as high quality as possible when the available memory band is constant.

It is common to the above-described image processes in FIGS. 13A to 13C that it is not sufficient to perform image processing in consideration of only one of two-dimensionally arranged image data. In some cases, correction data is necessary, combined data is necessary, or the number of image data for use is arbitrary. The method of acquiring image data, correction data, or combined data necessary for the image processing changes depending on the sensor shape. For example, data needs to be repetitively read out from a storage device such as an external memory. The number of rendering images to be read out may change depending on a number designated by the user. The number of field images to be read out may change according to the input resolution of the broadcast wave.

These days, the resolution of digital image data is increasing to improve the image quality for differentiation of devices. Along with this, the data processing amount in image processing is increasing. Implementation of higher-quality, advanced-function products require various kinds of information. However, in product development, it is desired to meet various image processing requests at limited cost. In other words, demand has arisen for an apparatus and method which flexibly perform a variety of image processes described above while keeping the memory band and circuit scale constant.

The conventional technique implements capacity reduction of the delay memory for spatial filtering by reading out one image data from an external memory for each band area when performing local image processing. However, the conventional technique does not examine a flexible change of the band area in accordance with the resolution and number of data for a plurality of correction data for one image data, a plurality of image data, and a plurality of successive field images. The number of data is the number of reference fields, that of rendering images, or that of correction data.

SUMMARY OF THE INVENTION

The present invention provides an image processing method and apparatus capable of flexibly coping with even changes of the data resolution and the number of references in order to achieve image processes in various forms in a predetermined memory band while reducing the capacity of the delay memory, similar to the conventional technique.

To solve the above problems, the present invention provides a method of processing an image in a unit of band area by dividing image data of a target image into a plurality of band areas, when processing image data by referring to at least one of reference image data and correction data. The method comprises the steps of: setting a minimum transfer unit of the image data; obtaining a minimum transfer unit of at least one of the reference image data and the correction data to process the image data in the minimum transfer unit; determining a transfer rate of the image data based on the set minimum transfer unit of the image data and the obtained minimum transfer unit of at least one of the reference image data and the correction data so that the image data to be buffered fits in a capacity of a buffer used in image processing; calculating a transfer rate of at least one of the reference image data and the correction data based on a ratio of the determined transfer rate of the image data to the set minimum transfer unit of the image data; and determining a height of the band area to be created by division, based on the ratio of the transfer rate of the image data to the set minimum transfer unit of the image data.

The present invention also provides an image processing apparatus for processing an image in a unit of band area by dividing image data of a target image into a plurality of band areas, when processing image data by referring to at least one of reference image data and correction data. The apparatus comprises: a transfer unit setting unit configured to set a minimum transfer unit of the image data; a transfer unit obtaining unit configured to obtain a minimum transfer unit of at least one of the reference image data and the correction data to process the image data in the minimum transfer unit; a transfer rate setting unit configured to determine a transfer rate of the image data based on the set minimum transfer unit of the image data and the obtained minimum transfer unit of at least one of the reference image data and the correction data so that the image data to be buffered fits in a capacity of a buffer used in image processing; a transfer rate calculating unit configured to calculate a transfer rate of at least one of the reference image data and the correction data based on a ratio of the determined transfer rate of the image data to the minimum transfer unit of the image data; and a band height calculating unit configured to determine a height of the band area to be created by division, based on the ratio of the transfer rate of the image data to the minimum transfer unit of the image data.

The present invention further provides a computer-readable storage medium which stores a program causing a computer to execute a method. The method comprises the steps of: setting a minimum transfer unit of the image data; obtaining a minimum transfer unit of at least one of the reference image data and the correction data to process the image data in the minimum transfer unit; determining a transfer rate of the image data based on the set minimum transfer unit of the image data and the obtained minimum transfer unit of at least one of the reference image data and the correction data so that the image data to be buffered fits in a capacity of a buffer used in image processing; calculating a transfer rate of at least one of the reference image data and the correction data based on a ratio of the determined transfer rate of the image data to the minimum transfer unit of the image data; and determining a height of the band area to be created by division, based on the ratio of the transfer rate of the image data to the minimum transfer unit of the image data.

According to the present invention, with a small circuit scale, image data of a target image can be divided into a plurality of band areas, and the image can be sequentially processed in units of the band areas created by division. Also, the height of the band area can be flexibly changed in a variety of image processes, and image processing corresponding to an arbitrary resolution can be executed with a small circuit scale, which has not been implemented by the conventional technique.

Further features of the present invention will become apparent from the following description of exemplary embodiments with reference to the attached drawings.

BRIEF DESCRIPTION OF THE DRAWINGS

FIG. 9 is a flowchart exemplifying output of pixel data;

FIGS. 13A to 13C are views exemplifying conventional image processing.

DESCRIPTION OF THE EMBODIMENTS

Preferred embodiments of the present invention will now be described with reference to the accompanying drawings.

In the first embodiment, image processing specified in band processing is performed. Accordingly, the first embodiment achieves capacity reduction of the delay memory in local or neighbor image processing such as spatial filtering described in U.S. Pat. No. 6,587,158, Japanese Patent Laid-Open No. 2000-312327, Japanese Patent No. 3733826, and Japanese Patent Laid-Open No. 2006-139606. Also, the first embodiment attains circuit-scale reduction and higher speeds by processing a plurality of pixels in one processing unit, as described in Japanese Patent Laid-Open No. 2006-139606. In addition, the first embodiment implements not processing for one image data, but image data correction processing and image processing which refer to at least either a plurality of image data or correction data. In the first embodiment, to achieve these objects, image processing is executed in a band area coordinate system different from a digital image data coordinate system (main scanning direction—sub-scanning direction).

<Overall Arrangement of Image Processing Apparatus>

Figure 1:
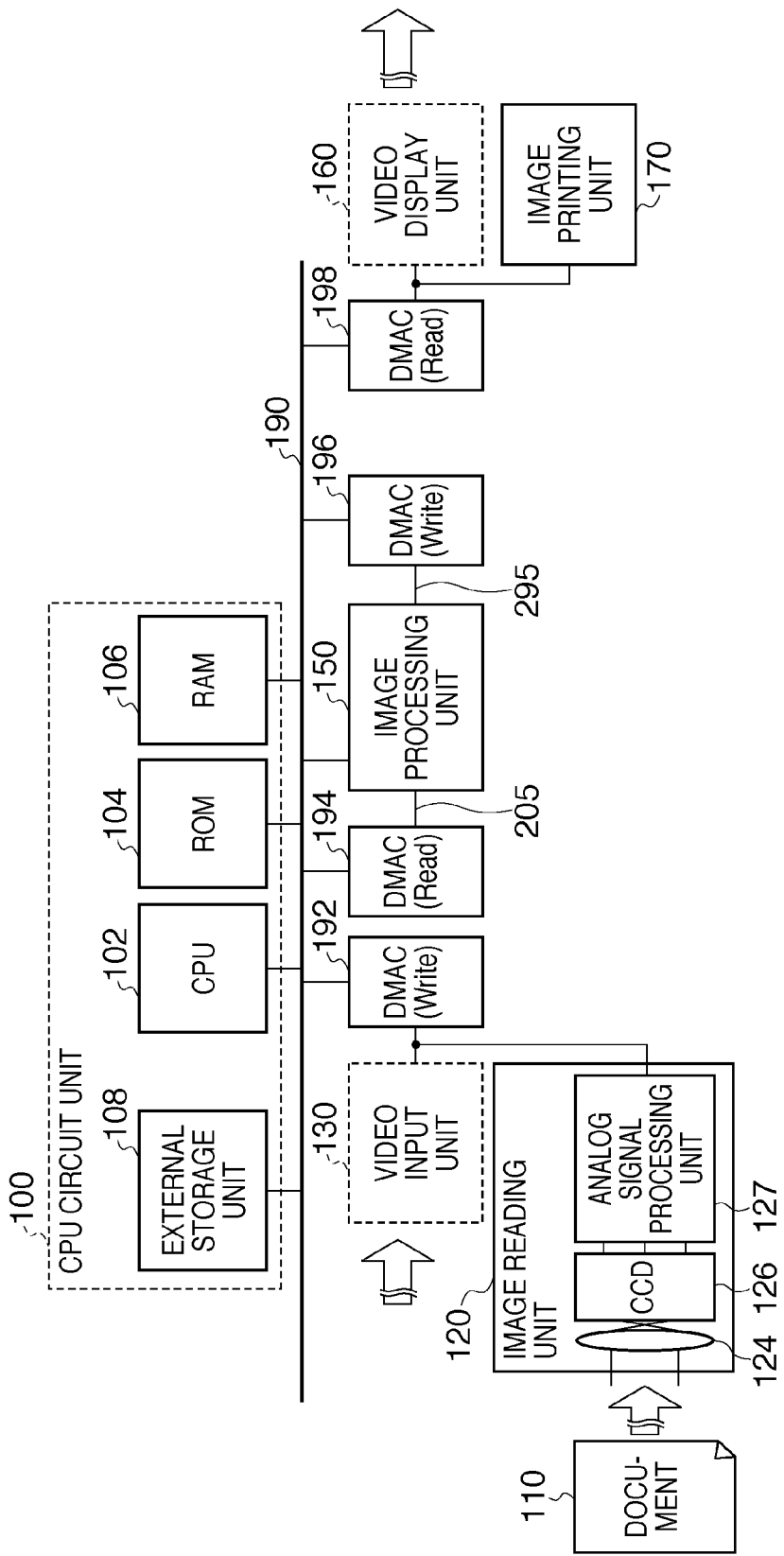
FIG. 1 is a block diagram exemplifying the overall arrangement of an image processing apparatus.

FIG. 1 is a block diagram exemplifying the overall arrangement of an image processing apparatus according to the first embodiment.

In FIG. 1, an image reading unit 120 includes a lens 124, CCD sensor 126, and analog signal processing unit 127. In the image reading unit 120, the CCD sensor 126 converts image information of a document 110, whose image is formed on the CCD sensor 126 via the lens 124, into R (Red), G (Green), and B (Blue) analog electrical signals. The analog signal processing unit 127 receives the analog electrical signals of the converted image information, performs correction and the like for each of R, G, and B, and converts them into digital signals (analog-to-digital (A/D) conversion). As a result, digital full-color signals (to be referred to as digital image data) are generated.

A DMAC (Direct Memory Access Controller) 192 whose operation is set in advance by a CPU 102 stores the generated digital image data in a RAM 106 of a CPU circuit unit 100 via a shared bus 190. The CPU 102 sets a DMAC 194 to read out the digital image data stored in the RAM 106, and input them to an image processing unit 150.

If necessary, the image processing unit 150 performs, for the input digital image data, correction of the individual differences between the reading elements of a sensor device such as a scanner, and color correction such as input gamma correction. The image processing unit 150 normalizes the read image, creating image data at a predetermined level. A DMAC 196, whose write operation is set in advance, stores the processed digital image data in the RAM 106 again. Also, if necessary, the image processing unit 150 executes, for the input digital image data, image processes directed to printing, such as input color processing, spatial filtering, color space conversion, density correction, and halftone processing, thereby creating printable image data. The DMAC 196 stores the processed digital image data in the RAM 106.

Finally, the CPU 102 sets a DMAC 198 to read out the digital image data which have undergone image processing and are stored in the RAM 106, and output them to an image printing unit (printer) 170. The image printing unit (printer) 170 includes, for example, a printout unit (not shown) such as a raster plotter using an inkjet head, thermal head, or the like. The image printing unit (printer) 170 prints an image on a sheet in accordance with an input digital image signal. Alternatively, a video display unit 160 such as a display displays and outputs an image in the second embodiment to be described later.

The CPU circuit unit 100 includes the arithmetic control CPU 102, a ROM 104 which stores permanent data and programs, the RAM 106 used to temporarily save data and load a program, and an external storage unit 108. The CPU circuit unit 100 controls the image reading unit 120, image processing unit 150, image printing unit (printer) 170, and the like to comprehensively control the sequence of the image processing apparatus in the embodiment. The external storage unit 108 is a storage medium such as a disk, which stores parameters, programs, and correction data used in the image processing apparatus of the embodiment. Data, programs, and the like in the RAM 106 may also be loaded from the external storage unit 108.

<Correction Processing>

Correction processing of correcting the individual differences between the reading elements of the sensor device for an image read by the image reading unit 120 in FIG. 1 will be explained. As described above, this image processing requires minimum read value data and maximum read value data for each reading element of the sensor device. These kinds of data are temporarily stored in the RAM 106, and the RAM 106 is generally formed from a low-cost DRAM. To read and write a variety of data via the DMAC in the above-described way, it is desirable to access data in a unit at which the DRAM allows read and write without impairing performance.

(Example of Data Structure of RAM 106)

A method of storing data in the RAM 106 will be explained with reference to FIG. 2.

Figure 2:
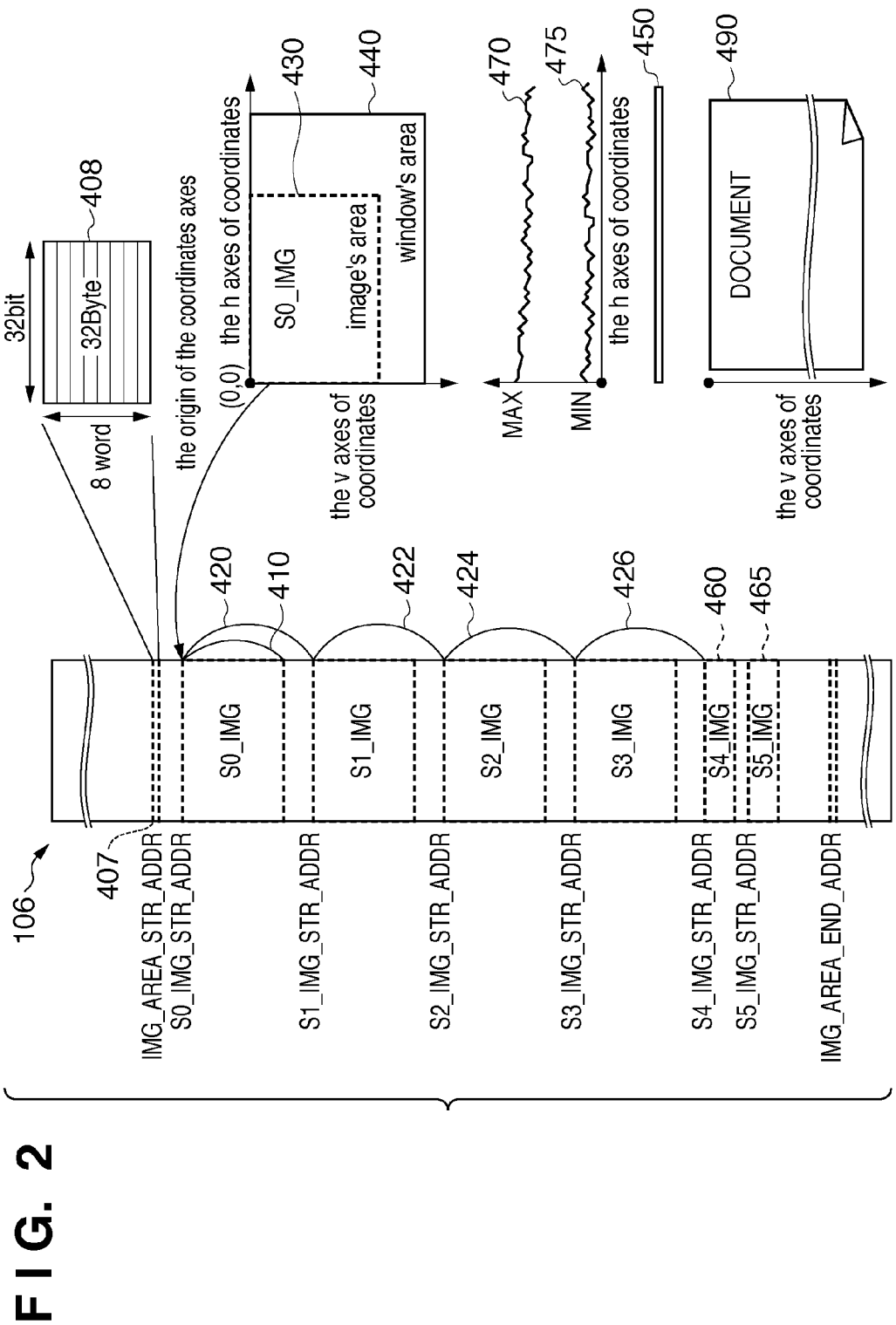
FIG. 2 is a view exemplifying storage of various data in a RAM.

Areas IMG_AREA_STR_ADDR to IMG_AREA_END_ADDR in FIG. 2 store various data necessary for image processing. In the example of FIG. 2, six types of data S0_IMG to S5_IMG are stored in these areas. The minimum unit of the capacity of each stored data is 32 bits×8 words=32 bytes, as represented by reference numeral 408, so as to be able to access data without impairing the DRAM performance. Needless to say, the data storage capacity of S0_IMG to S5_IMG is an integer multiple of 32 bytes.

For example, for two-dimensional image data, an area 420 corresponding to a maximum image area (window's area) 440 is reserved in the memory. The area of S0_IMG (image's area) 430 falling within the maximum image area (window's area) 440 is stored in an area 410 in the memory. Areas 422, 424, and 426 in the memory correspond to maximum image areas containing S1_IMG to S3_IMG, respectively.

When reading a document while a line sensor device 450 of a scanner moves with respect to a document 490 in the sub-scanning direction (v), correction data (MAX) 470 and correction data (MIN) 475 are distributed in the main scanning direction (h) of the line sensor device 450. In the example of FIG. 2, these data are stored in S4_IMG 460 and S5_IMG 465 in the RAM 106.

Figure 3:
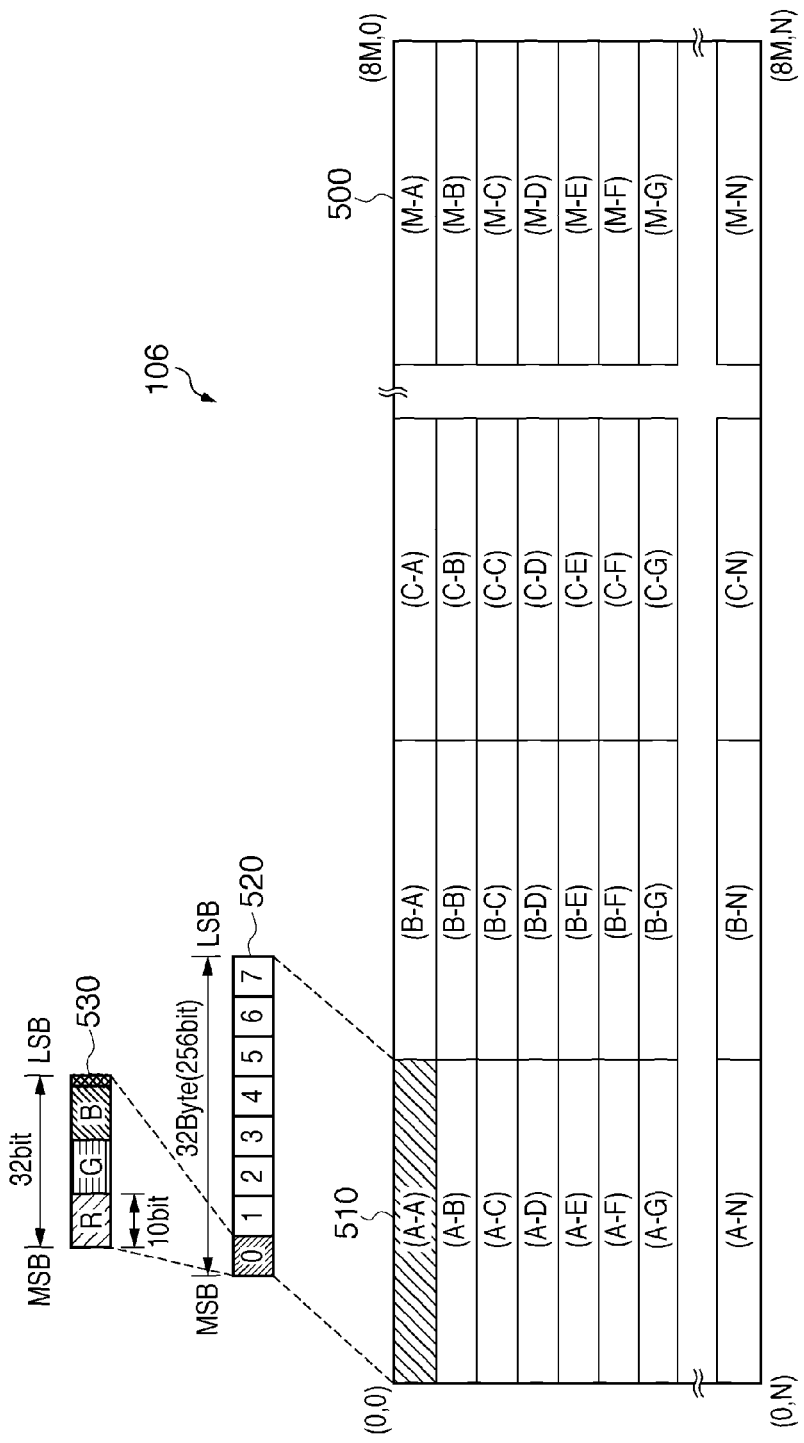
FIG. 3 is a view exemplifying storage of the pixel value of image data.

The data structure will be explained in detail with reference to FIG. 3.

A bold frame 500 represents image data in the area of the S0_IMG (image's area) 430. An area 510 stores 32-byte data mentioned above. Data 520 of eight pixels are packed in the area 510. As represented by 530, R (Red), G (Green), and B (Blue) data each of 10 bits are packed in one pixel data. In the example of FIG. 3, the remaining 2 bits are invalid data and are not used, in order to facilitate data access to the DRAM. The range of the bold frame 500 in FIG. 3 means an image having an 8M×N size. Correction data of the scanner sensor device that are stored in the S4_IMG 460 and S5_IMG 465 are data in a range of coordinates (0,0) to (8M,0) because of a 1-line line sensor.

As described with reference to FIGS. 2 and 3, the RAM 106 stores image data and correction data of an image read by the image reading unit 120.

(Example of Arrangement of Image Processing Unit 150)

Figure 4:
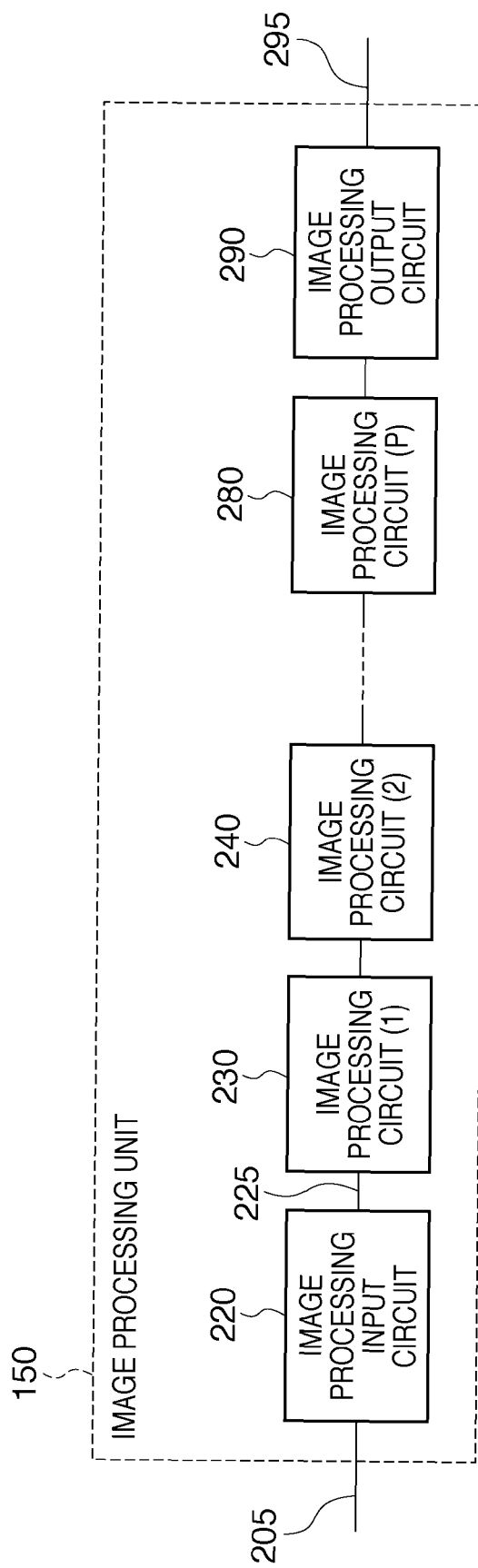
FIG. 4 is a block diagram exemplifying the circuit arrangement of an image processing unit.

FIG. 4 is a block diagram exemplifying the arrangement of the image processing unit 150 in the first embodiment.

The CPU 102 activates the DMAC 194 to read out the stored read image data and correction data from the RAM 106. The DMAC 194 inputs the readout data to the image processing unit 150 in FIG. 4, which is an example of the main circuit arrangement of the image processing apparatus in the embodiment.

The read image data and correction data are input to the image processing unit 150 via the DMAC 194 and a bus 205. As will be described in detail later, an image processing input circuit 220 receives various kinds of data, and extracts pixel data (pixel value) of one pixel in an order (to be described later) from the read image data packed as shown in FIG. 3, correction data (MAX) and correction data (MIN). The image processing input circuit 220 sends the pixel data to a subsequent image processing circuit (1) 230, and image processing circuit (2) 240, . . . , image processing circuit (P) 280, where a variety of correction processes (or image processes) are done. An image processing output circuit 290 generates data which are packed again in 32-byte data in FIG. 3. The image data having undergone correction processing (image processing) are written back in the RAM 106 via the DMAC 196 and a bus 295. One of the image processing circuit (1) 230 to image processing circuit (P) 280 corrects the individual differences between the reading elements of the sensor device in accordance with equation (1). As a matter of course, image processes such as input color processing, spatial filtering, color space conversion, density correction, and halftone processing are also executed.

<Data Transfer from RAM 106 to Image Processing Input Circuit 220>

Figure 5:
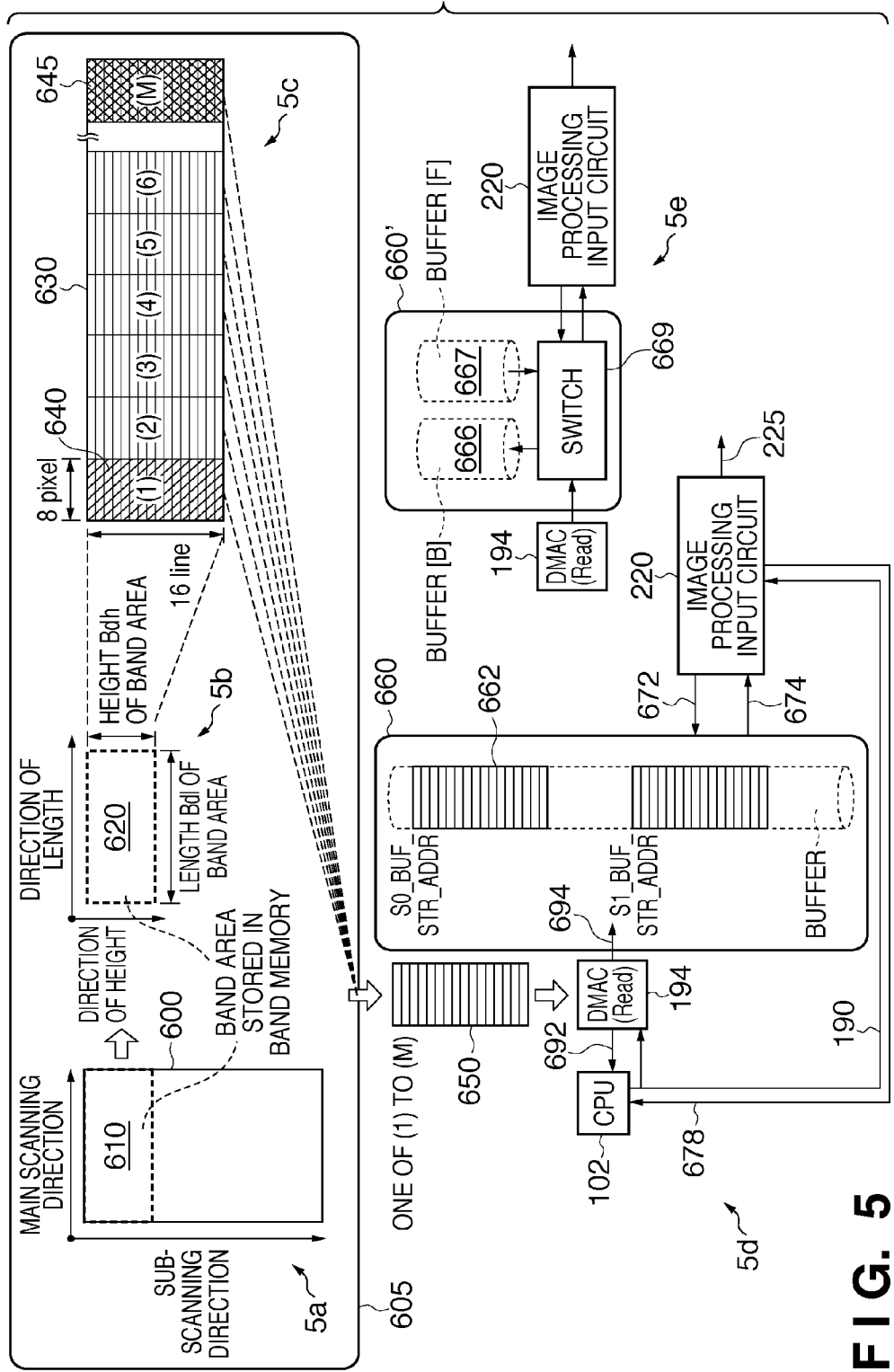
FIG. 5 is a view exemplifying an operation to store data necessary for image processing in the buffer from the RAM and output pixel data from an image processing input circuit.

FIG. 5 is a view for explaining in detail a method of inputting the foregoing image data and correction data from the RAM 106 to the image processing input circuit 220 when an image processing method in the first embodiment is adopted.

The RAM 106 stores image data surrounded by a dotted line 605. Image data 600 in 5a of FIG. 5 is the entire image data. A band area 610 is extracted from the image data 600 and undergoes the image processing method in the first embodiment. The band area 610 to be processed has a band area height Bdh of 16 lines (16 pixels) and a band area length Bdl of 8×M pixels in the band area coordinate system, as shown in 5b and 5c of FIG. 5. The CPU 102 in 5d of FIG. 5 sets, in the DMAC 194 via the shared bus 190, the start address of the band area 610 in the RAM 106, the successively reading count, the increment address, and the repetition count. The successively reading count indicates the count at which 32-byte data are successively read out. In the example of FIG. 5, the start address is S0_IMG_STR_ADDR in FIG. 2, the successively reading count is one (32 bytes), the increment address is a 1-line data amount of (32 bytes×M), and the repetition count is 16.

As shown in 5d of FIG. 5, a shared buffer 660 is interposed between the DMAC 194 and the image processing input circuit 220, and enables data access from the two modules. Thus, the CPU 102 also instructs the DMAC 194 via the shared bus 190 about the write start address of the shared buffer serving as a destination to write acquired data. In the example of FIG. 5, an address S0_BUF_STR_ADDR is set to temporarily save data in an area 662 of the shared buffer 660. Upon receiving the instruction from the CPU 102, the DMAC 194 reads out data from one (denoted by 650) of an area (1) 640 to area (M) 645 in a band area 630 shown in 5c of FIG. 5 in the image data in the RAM 106. The DMAC 194 stores the acquired data in the area 662 of the shared buffer 660 via a bus 694. Then, the DMAC 194 notifies the CPU 102 of a transfer termination using an interrupt signal 692.

The CPU 102 sets the following image processing parameters via the shared bus 190. The image processing parameters include the processing data count, a data identifier (number), the band area height, the image data format, the left end deleting pixel count, the right end deleting pixel count, the upper end margin pixel count, the lower end margin pixel count, the left end margin pixel count, and the right end margin pixel count. Further, the image processing parameters include the degree of parallelization indicating N pixels (pixel group: N is an integer of 1 or more) successive in the direction of length of the band area, the scan mode, and the reading start address S0_BUF_STR_ADDR of the shared buffer. The CPU 102 activates the image processing input circuit 220. The image processing input circuit 220 performs read access to the shared buffer 660 using a control signal 672 including a chip select signal and address signal, thereby acquiring read data 674. The image processing input circuit 220 executes an operation (to be described later), selects pixel data (pixel value) of one pixel, and outputs it to an internal bus 225 of the image processing unit 150. Then, the image processing input circuit 220 notifies the CPU 102 of an input operation termination using an interrupt signal 678.

Note that the shared buffer may be formed from at least two buffers 666 and 667, like a shared buffer 660' in 5e of FIG. 5. In the example of 5d of FIG. 5, one buffer is shared between the DMAC 194 and the image processing input circuit 220 and thus operates in time division. However, the arrangement of the shared buffer 660' in 5e of FIG. 5 allows the DMAC 194 to transfer the next image data from the RAM 106 to the shared buffer 660' while the image processing input circuit 220 acquires pixel data from the shared buffer 660'. This enables parallelization of processes by the DMAC 194 and image processing input circuit 220.

To perform image processing for the band area of image data, the same operation is repeated by M times for the area (1) 640 to area (M) 645 shown in 5d of FIG. 5. As described above, image data is acquired from the RAM 106 to the shared buffer. As for two correction data, the repetition count is set to 1 (i.e., the height of the band area is one line) in the DMAC 194. Then, necessary data are sequentially acquired by the same operation as that of image data.

When N is an integer of 2 or more, N pixels to be processed are simultaneously acquired and simultaneously provided to N image processing circuits.

<Sequence to Determine Height of Band Area>

Figure 6A:
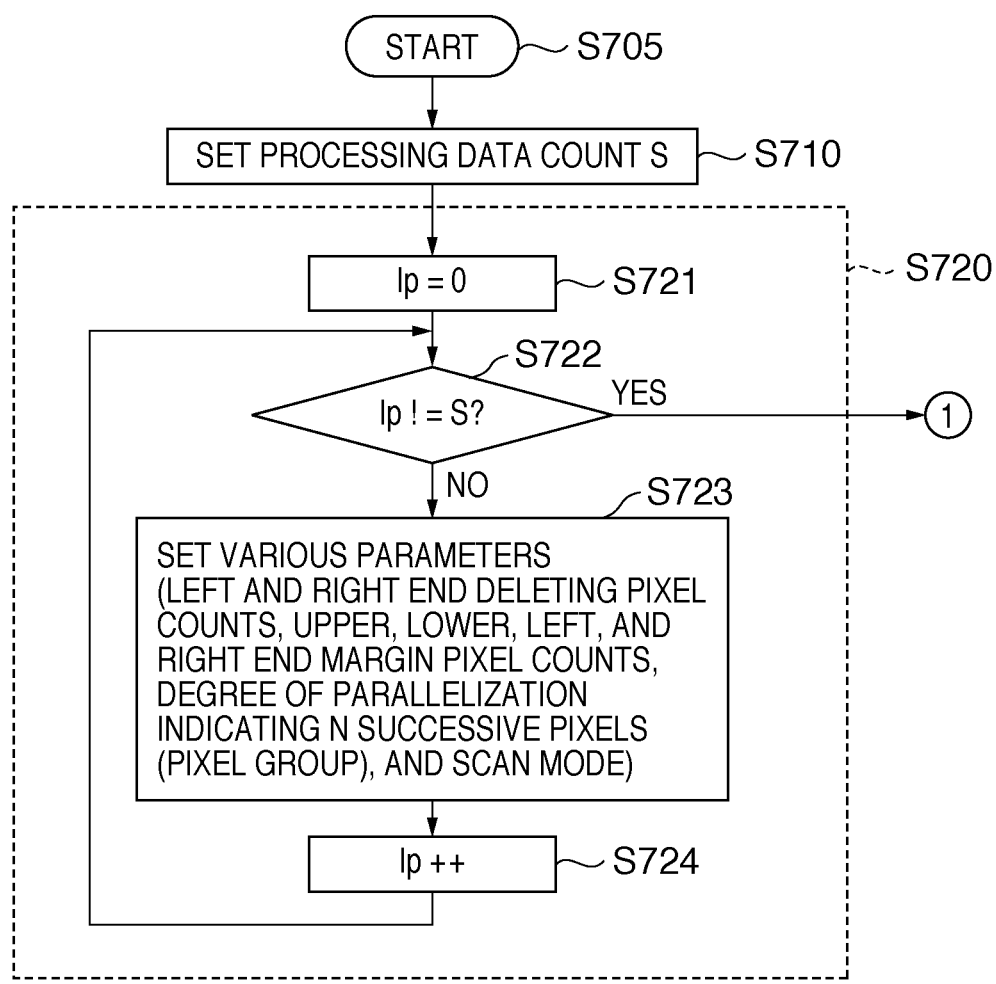
FIGS. 6A and 6B are flowcharts exemplifying an image processing sequence.
Figure 6B:
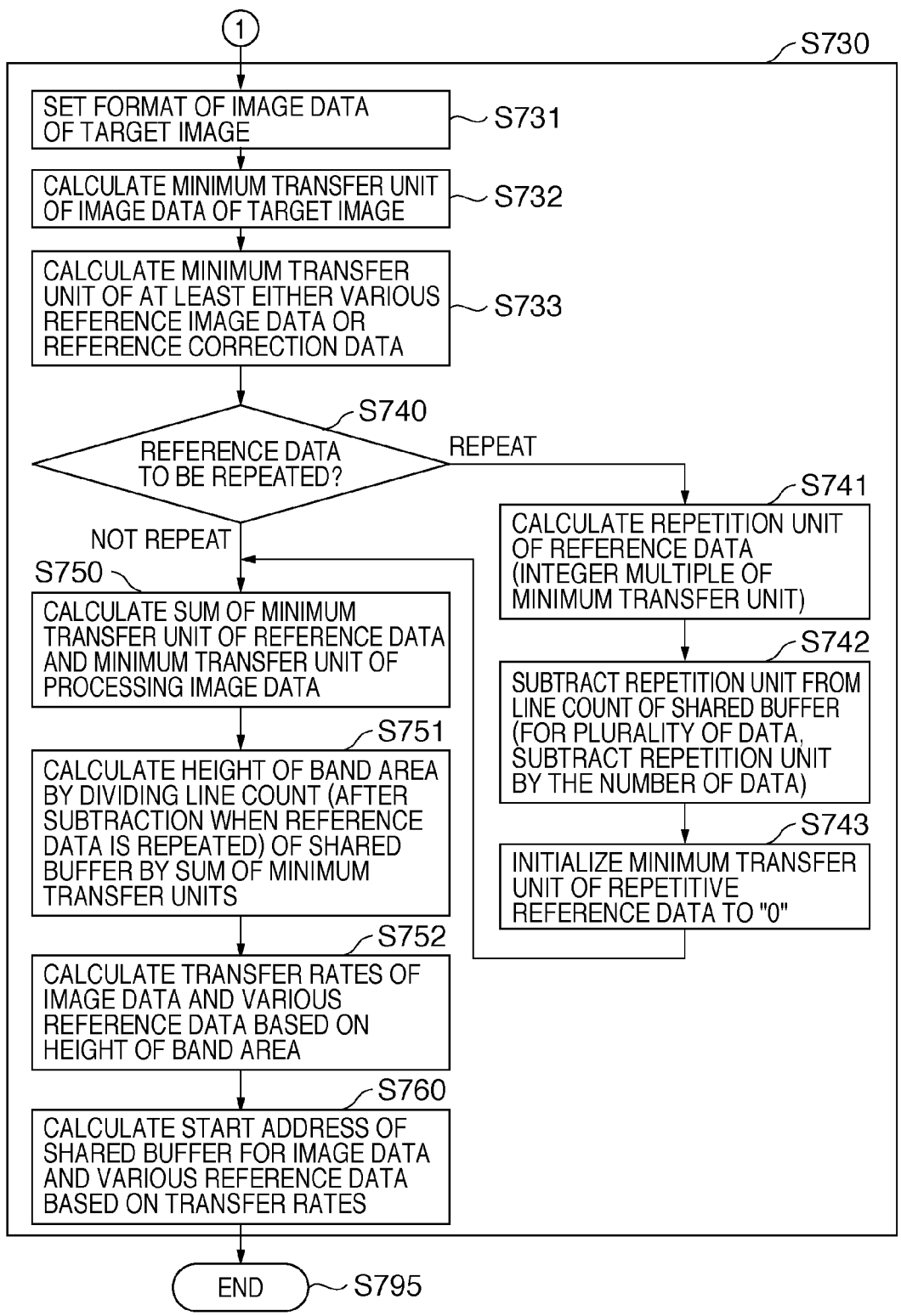

A sequence to determine the height of the band area in the first embodiment will be explained with reference to FIGS. 6A and 6B. FIGS. 6A and 6B are a flowchart exemplifying the processing sequence of a program executed by the CPU 102.

The CPU 102 starts processing (S705), and sets the number of various data necessary in correction processing as a processing data count S (S710). In the embodiment, the processing data count is "3". A data identifier (number) "0" is added to the first processing data to identify the data as read image data to be corrected. A data identifier (number) "1" is added to the second processing data to identify the data as correction data (MAX) of the sensor device. A data identifier (number) "2" is added to the third processing data to identify the data as correction data (MIN) of the sensor device. The number of pixels contained in 32-byte data is defined based on the setting of the image data format described with reference to FIG. 3. In the embodiment, image data of a target image and correction data (MAX and MIN) have the same data format as that shown in FIG. 3 for descriptive convenience.

The CPU 102 sets the following parameters by the processing data count S for processing to be described later (S720). For example, the parameters include the left end deleting pixel count, the right end deleting pixel count, the upper end margin pixel count, the lower end margin pixel count, the left end margin pixel count, and the right end margin pixel count, the degree of parallelization indicating N pixels (pixel group) successive in the direction of length of the band area, and the scan mode, which are necessary for the operation of the input image processing circuit. More specifically, the CPU 102 initializes a variable Ip (S721), and until the variable Ip reaches S (S722), repeats setting of various parameters (S723) and the variable Ip+1 (S724).

After the end of setting parameters (YES in S722), the CPU 102 calculates the height of the band area and the reading start address of the shared buffer (S730). First, the CPU 102 sets the format of image data of a target image (S731). In the example of the foregoing data format, 32-byte data indicates one line of image data. Correction processing in the embodiment requires correction data (MAX and MIN) for processing image data of one line. Since the embodiment adopts a line sensor, correction data for one line is repeated in the sub-scanning direction of a read document. Thus, the correction data is identical for all image data on the column A (from A-A to A-N) of image data in FIG. 3. Correction data (MAX) for processing pixel data (8×N lines) in the area of the column A suffices to be 32 bytes for one line×eight pixels. This also applies to correction data (MIN).

Assuming that the shared buffer has a capacity of {256 bits (=32 bytes)×BL words} and can hold various data of the BL line, the following calculation will be explained.

The CPU 102 calculates the minimum transfer unit of image data of the target image and that of correction data (MAX and MIN) for correcting the image data (S732 and S733). In this example, the minimum transfer unit of image data is 32 bytes (corresponding to one word (one line) of the shared buffer). The minimum transfer unit of correction data (MAX and MIN) for correcting the image data is also 32 bytes. In the embodiment, the same correction data is repeated for the column A of the image data ("repeat" in S740). In this case, (32 bytes×2) correction data are necessary to process the minimum transfer unit "32 bytes" of image data (S741). Even if the processing line count of image data increases, the line count of correction data does not increase. Thus, the CPU 102 obtains, as an image data transfer rate, a value obtained by subtracting "2" from the buffer line count BL (S742), and sets "0" as the minimum transfer unit of reference data (S750). The CPU 102 sets, as the height of the band area, a value obtained by dividing, by the minimum transfer unit "32 bytes" of image data, the value obtained by subtracting "2" from the buffer line count BL (S751).

Finally, the CPU 102 sets the start addresses S0_BUF_STR_ADDR, S1_BUF_STR_ADDR, and S2_BUF_STR_ADDR of the shared buffer (S760). In the above-mentioned example, image data: S0_BUF_STR_ADDR=0 correction data (MAX): S1_BUF_STR_ADDR=BL−2 correction data (MIN): S2_BUF_STR_ADDR=BL−1

In this example, only correction processing based on correction data has been described. Another image processing based on reference image data is also implemented in the same manner (see S733).

<Example of Arrangement and Processing of Image Processing Input Circuit 220>

(Example of Arrangement of Image Processing Input Circuit 220)

Figure 7:
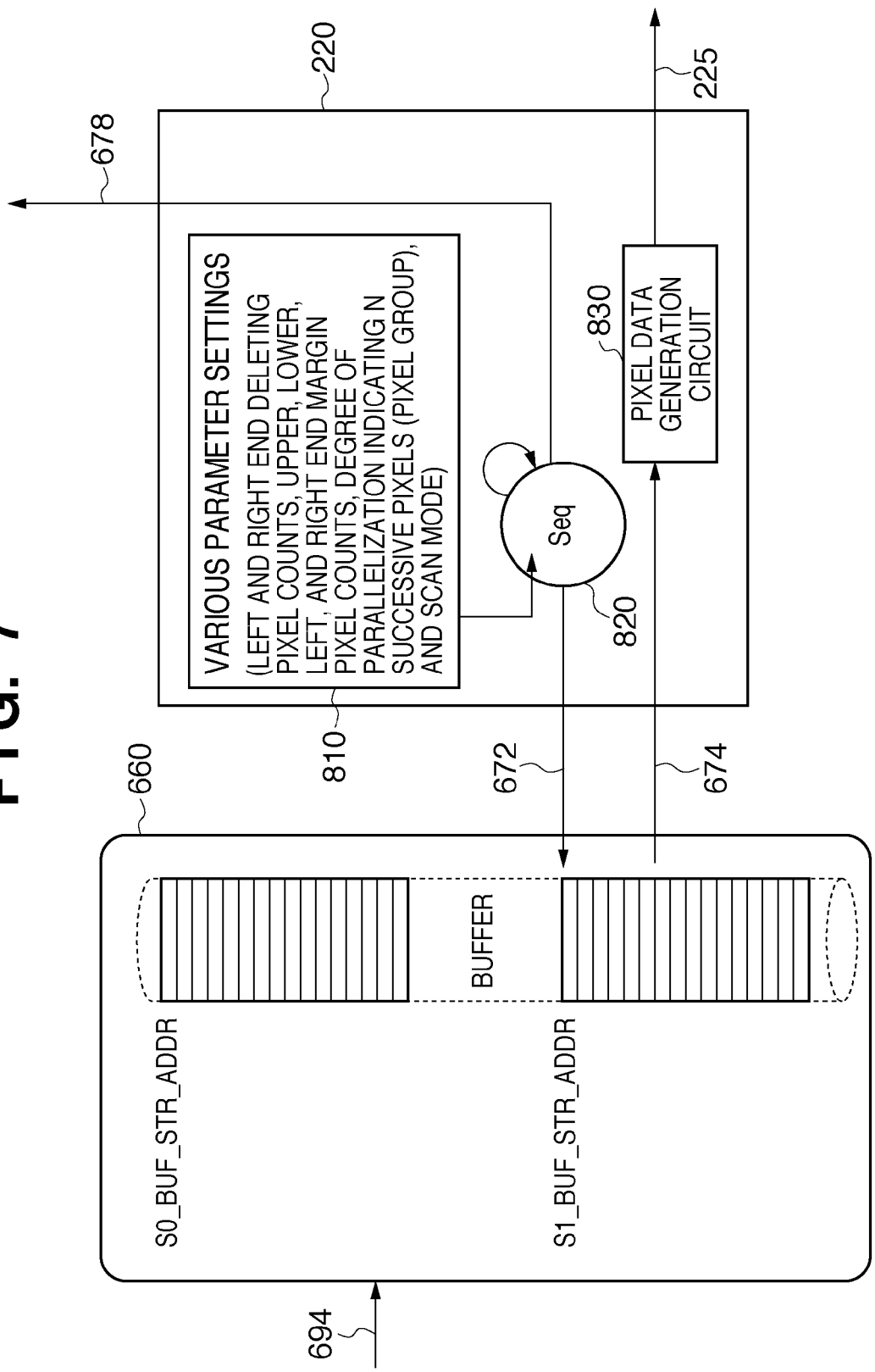
FIG. 7 is a view exemplifying the arrangement of the image processing input circuit of the image processing apparatus.

FIG. 7 shows the internal arrangement of the image processing input circuit 220 in the embodiment. In FIG. 7, the same reference numerals as those in FIG. 5 denote the same functional elements and signals.

In FIG. 7, the CPU 102 sets operation parameters 810, an internal register stores their values, and a sequencer 820 runs. This operation will be described with reference to FIGS. 8A, 8B, and 9. The sequencer 820 calculates the address of the shared buffer 660, acquiring the 32-byte data 674 from the shared buffer 660. A pixel data generation circuit 830 generates data of one pixel or data of N pixels successive in the direction of length of the band area, and outputs the generated data to the internal bus 225 of the image processing unit 150.

(Example of Processing of Image Processing Input Circuit 220)

Figure 8A:
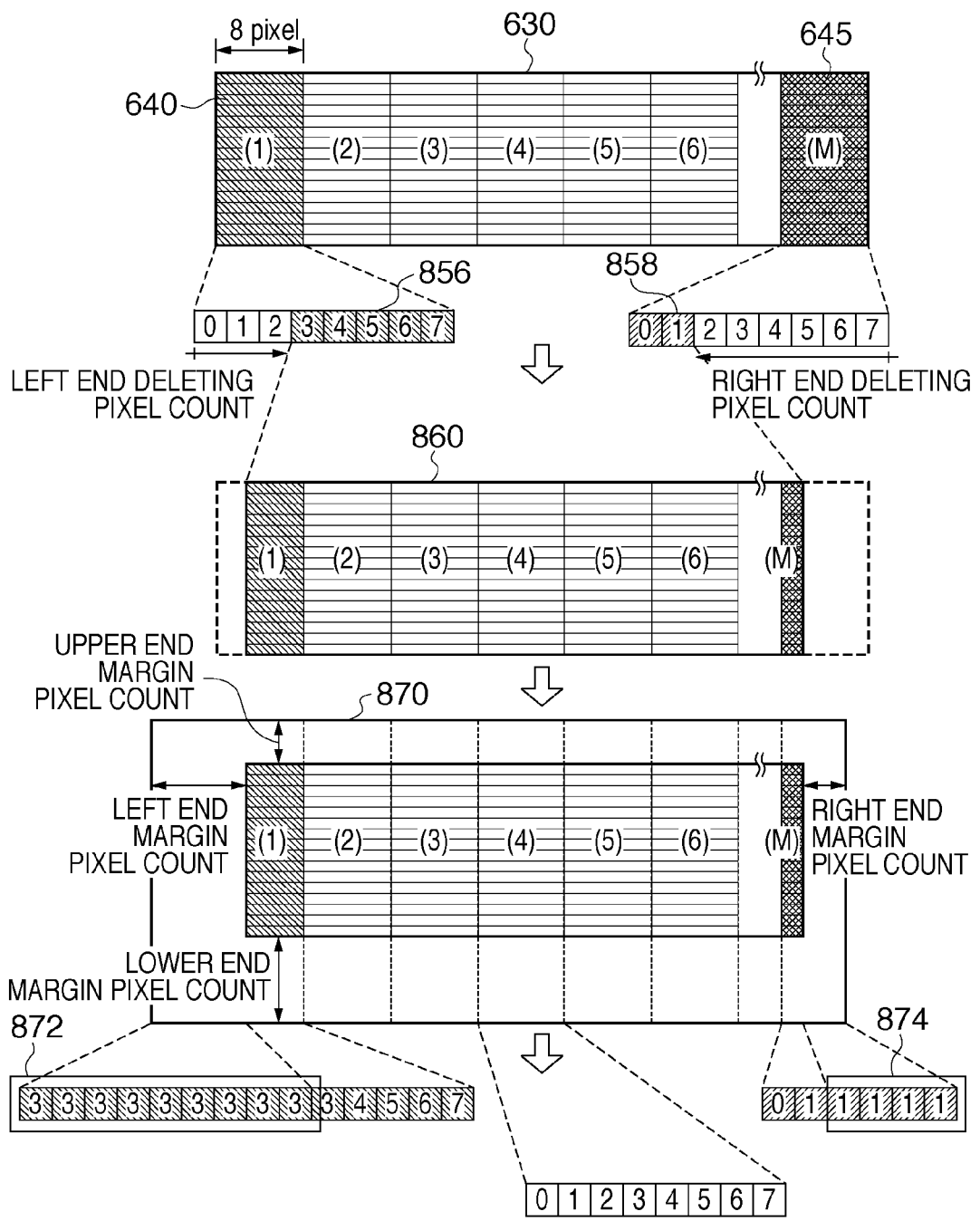
FIG. 8A is a view exemplifying the operation of the image processing input circuit of the image processing apparatus.

To perform image processing for the band area of image data, data processing for 32 bytes×line count (to be referred to as a transfer block) is repeated by M times for the area (1) 640 to area (M) 645 in FIG. 8A. Since data processing is repeated by M times for at least one of image data, a plurality of image data to be referred to, and correction data. Hence, correction processing in the embodiment is repeated by a total of 3M times. The left and right end deleting pixel counts are set for each data to perform trimming processing (processing of trimming unnecessary end pixels) for each data in the direction of length of the band area.

A deleting pixel count exceeding the 32-byte pixel area of the image data format cannot be set. More specifically, the data format in the embodiment is eight pixels/32 bytes, so the left and right end deleting pixel counts take values of up to 7. To trim more than seven pixels, a block to be transferred is not transferred when read out from the RAM 106. The settings of the left and right end deleting pixel counts are significant only in the first transfer block in the area 640 and final transfer block in the area 645. The setting of the left end deleting pixel count affects the first transfer block in the area 640, a hatched area 856 (pixels 3 to 7) becomes valid, and pixels 0 to 2 are deleted. Similarly, the setting of the right end deleting pixel count affects the final transfer block in the area 645, a hatched area 858 (pixels 0 and 1) becomes valid, and pixels 2 to 7 are deleted. Accordingly, image data in the area 860 after trimming processing is generated.

After that, the image data in the area 860 after trimming processing is expanded by copying end pixels by designated pixel counts (upper, lower, left, and right end margin pixel counts), generating a margin area and obtaining image data in the area 870. Some image processing circuits perform local image processing such as spatial filtering and desirably have this margin area generation function to perform local image processing at the upper, lower, right, and left ends of image data.

Since the embodiment targets scanner correction, a desired output image can be attained without the margin area generation function as long as the scanner reading area is set wide in advance. However, in the second embodiment (to be described later), the input is a standardized video signal such as the broadcast wave, so the margin-area-generation function is essential to obtain a desired output image. Based on the settings of the upper, lower, left, and right end margin pixel counts, the sequencer 820 accesses the shared buffer 660 in consideration of the margin areas.

More specifically, for the transfer block in the area (1) 640, the address of the shared buffer is not incremented while generating upper or lower end margin pixels in consideration of the upper, lower, and left end margin pixel counts. Pixels are regarded to exist upon expanding the left end of readout 32-byte pixel data, like 872. Similarly for the transfer blocks in the areas (2) to (M−1), the address of the shared buffer is not incremented while generating upper or lower end margin pixels. The 32-byte pixel area need not be considered to be expanded at the left and right ends. Similarly for the final transfer block in the area (M) 645, the address of the shared buffer is not incremented while generating upper or lower end margin pixels. Pixels are regarded to exist upon expanding the right end of readout 32-byte pixel data, like 874.

Figure 8B:
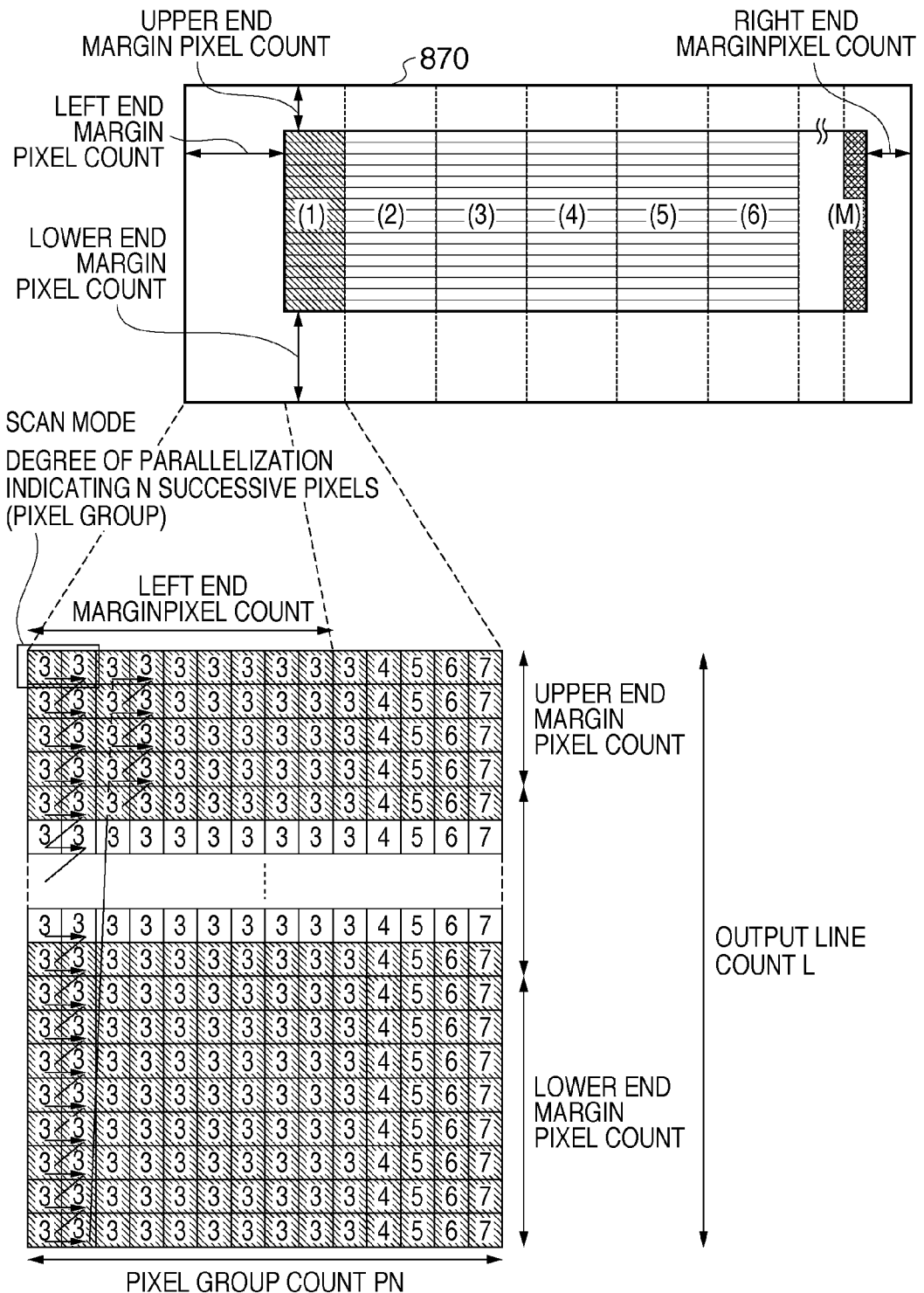
FIG. 8B is a view exemplifying the operation of the image processing input circuit of the image processing apparatus.

FIG. 8B is a view for explaining how to output, via the internal bus 225, the image data in the area 870 generated by the trimming processing and end expansion processing using the margin-area-generation function. FIG. 8B exemplifies the transfer block in the area (1) 640.

An output line count L is the sum of line counts indicating upper end margin pixels, lower end margin pixels, and a band height. The pixel-data-output method changes depending on the degree of parallelization indicating N pixels (pixel group) successive in the direction of length of the band area, and the scan mode, which are set by the CPU 102. Pixels are output successively in the direction of length of the band area in accordance with the setting of the degree of parallelization. The setting of the scan mode determines whether to output N pixels in one pixel/cycle or simultaneously (in parallel) output them in N pixels/cycle. In the simultaneous (parallel) output in N pixels/cycle, the internal bus 225 of the image processing unit 150 needs to have a band sufficient to simultaneously output N pixels, and a subsequent image processing circuit also needs to parallel-process N pixels. Further, the pixel count of 32 bytes of the image data format, the left end deleting pixel count, the left end margin pixel count, and a pixel group count PN determined by the degree of parallelization need to be integers.

<Example of Sequence to Output Pixel Data to Internal Bus 225 of Image Processing Input Circuit>

An example of a sequence to output pixel data to the internal bus 225 of the image processing input circuit 220 will be summarized in the flowchart of FIG. 9.

As is apparent from a loop (S961, S962, S970, and S963) in step S960, the pixel groups of image data or various reference data (at least either a plurality of correction data or image data) are output in order and provided to the image processing circuits. The image processing circuits 230, 240, . . . , 280 in FIG. 4 sequentially receive image data of N pixels, correction data MAX, and correction data MIN. Upon receiving all the data, the image processing circuits 230, 240, . . . , 280 execute correction processing to output data of N pixels having undergone correction processing. Various data are discriminated by the data identifier (number) mentioned above. These processes are repeated for respective lines in the direction of height of the band area, as represented by a loop (S951, S952, S960, and S953) in step S950. However, for correction data, the band height is one line, and data is repetitively read from the shared buffer address of the same line. After outputting the area of pixels corresponding to an output line count (L×N), only the pixel group (N pixels) is scanned in the direction of length of the band area, and then the process targets respective pixels, as represented by a loop (S941, S942, S950, and S943) in step S940. By repeating these processes, the process shifts by the pixel group count PN. After processing all (PN×N×L) pixels, the process ends for one transfer block (1) and is repeated for the subsequent transfer blocks (2) to (M).

The second embodiment will be explained as another embodiment of the present invention. The same reference numerals as those in the first embodiment denote arrangements and steps having the same functions in the second embodiment, and a description of the same arrangements and functions will not be repeated.

The second embodiment is different from the first embodiment in that a variety of data are input via a video input unit 130 in FIG. 1, and a video display unit 160 outputs processed data to a display device such as a display. The operations of the remaining building components in FIG. 1 are the same as those in the first embodiment. The arrangement of the image processing unit in FIG. 4 is the same as that in the first embodiment.

In the second embodiment, a plurality of image data and combined data necessary to process image data are two-dimensional data, unlike the first embodiment. The same data value is repeated in the sub-scanning direction, unlike correction data (MAX and MIN) in the first embodiment. Thus, image data and combined data are stored in a coordinate system 440 similarly to S0_IMG to be processed, like S1_IMG, S2_IMG, and S3_IMG in FIG. 2. The second embodiment also assumes that various image data and combined data have the data format in FIG. 3 for descriptive convenience. The operation to acquire a variety of data from a RAM 106 to a shared buffer 660 is also the same as that in the first embodiment.

<Method of Determining Height of Band Area>

The second embodiment is different from the first embodiment in a method of determining the height of the band area. The difference will be explained.

A CPU 102 sets the number of various data necessary in image processing as a processing data count S. When combining two rendering images, necessary data are a total of three types of data, i.e., one image data to be processed, image data to be combined, and combined data, and S=3. When performing I/P conversion for three field images, image data of one past field and that of one future field are necessary for a field image in the target time, necessary data are a total of three types of data, and S=3. When performing I/P conversion for five field images, image data of two past fields and those of two future fields are necessary for a field image in the target time, necessary data are a total of five types of data, and S=5. Note that the data identifier (number), the left end deleting pixel count, the right end deleting pixel count, the upper end margin pixel count, the lower end margin pixel count, the left end margin pixel count, the right end margin pixel count, the degree of parallelization indicating N pixels (pixel group) successive in the direction of length of the band area, and the scan mode are set by the processing data count S. However, this is the same as the first embodiment, and a description thereof will not be repeated.

Then, the CPU 102 calculates the height of the band area and the reading start address of the shared buffer. In the above-described format, 32-byte data indicates one line of image data. In the second embodiment, each of other image data and combined data is also formed from 32 bytes (one line) in order to process 1-line image data. Assuming that a shared buffer 660 has a capacity of {256 bits (=32 bytes)×BL words} and can hold various data of the BL line, the following calculation will be explained.

The minimum transfer unit of image data is 32 bytes (corresponding to one word (one line) of the shared buffer). The minimum transfer unit of various data for processing the image data is also 32 bytes. That is, various data of (32 bytes×2) are required to combine two rendering images in order to process the minimum transfer unit "32 bytes" of image data. This also applies to I/P conversion for three field images. I/P conversion for five field images requires various data of (32 bytes×4). From this, the height (line count) of the band area is as follows:

combination processing for two rendering images $BL$ lines/(1 line+2 lines)=$BL/3$ I/P conversion for three field images $BL$ lines/(1 line+2 lines)=$BL/3$ I/P conversion for five field images $BL$ lines/(1 line+4 lines)=$BL/5$ The height of the band area is represented by a value obtained by dividing the buffer line count BL by the sum of the minimum transfer unit "32 bytes" of image data and the minimum transfer unit of data necessary to process the image data.

The start address of the shared buffer 660 is one of addresses arranged at equal intervals each corresponding to the height (line count) of the band area. See the calculation sequence when "not repeat" is determined in S740 of whether to repeat reference data in FIG. 6.

A method of outputting pixel data to the image processing circuit after writing desired image data and various reference data in the shared buffer in accordance with the setting of the band height is the same as that in the first embodiment.

OTHER EMBODIMENTS

Figure 12:
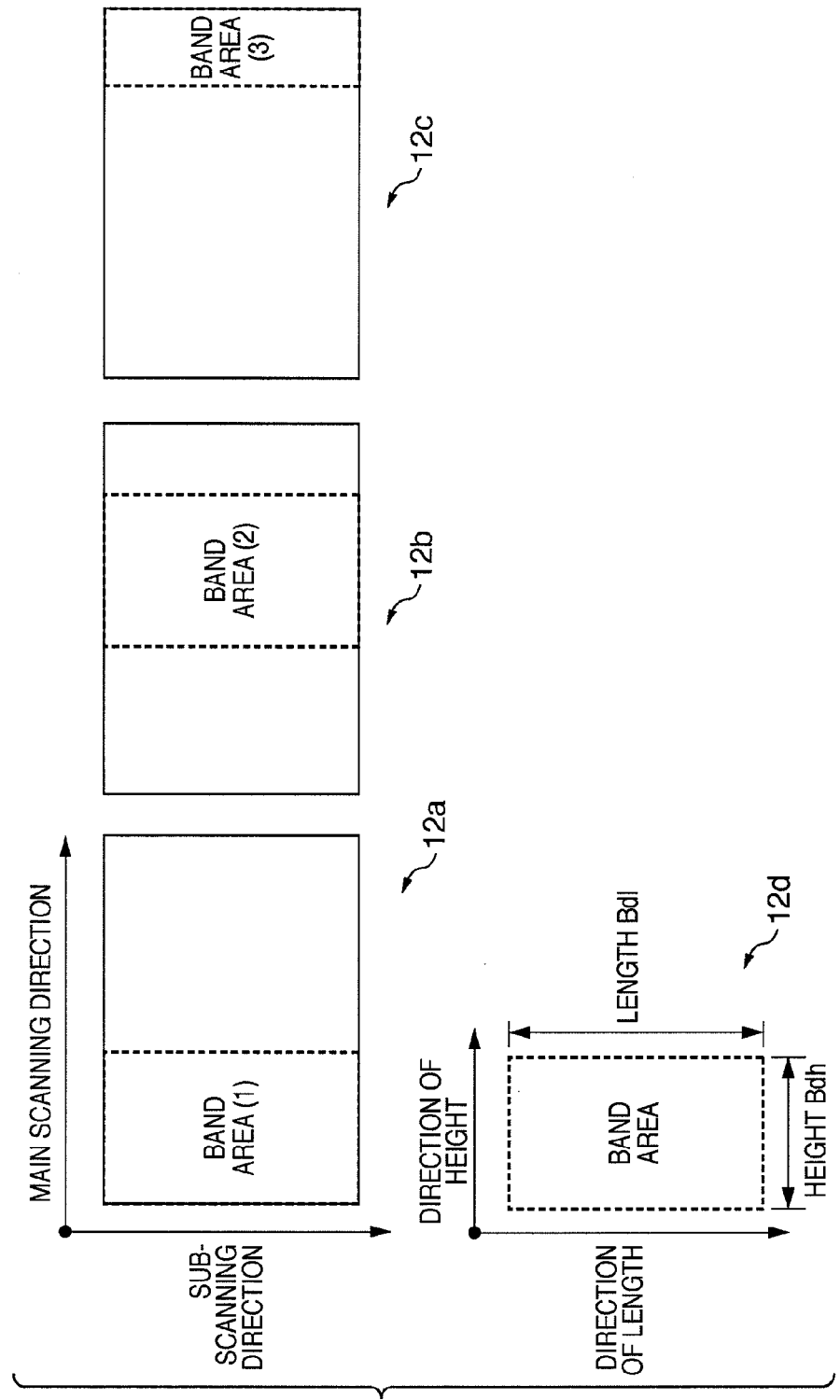
FIG. 12 is a view exemplifying a band processing operation.
Figure 13A:
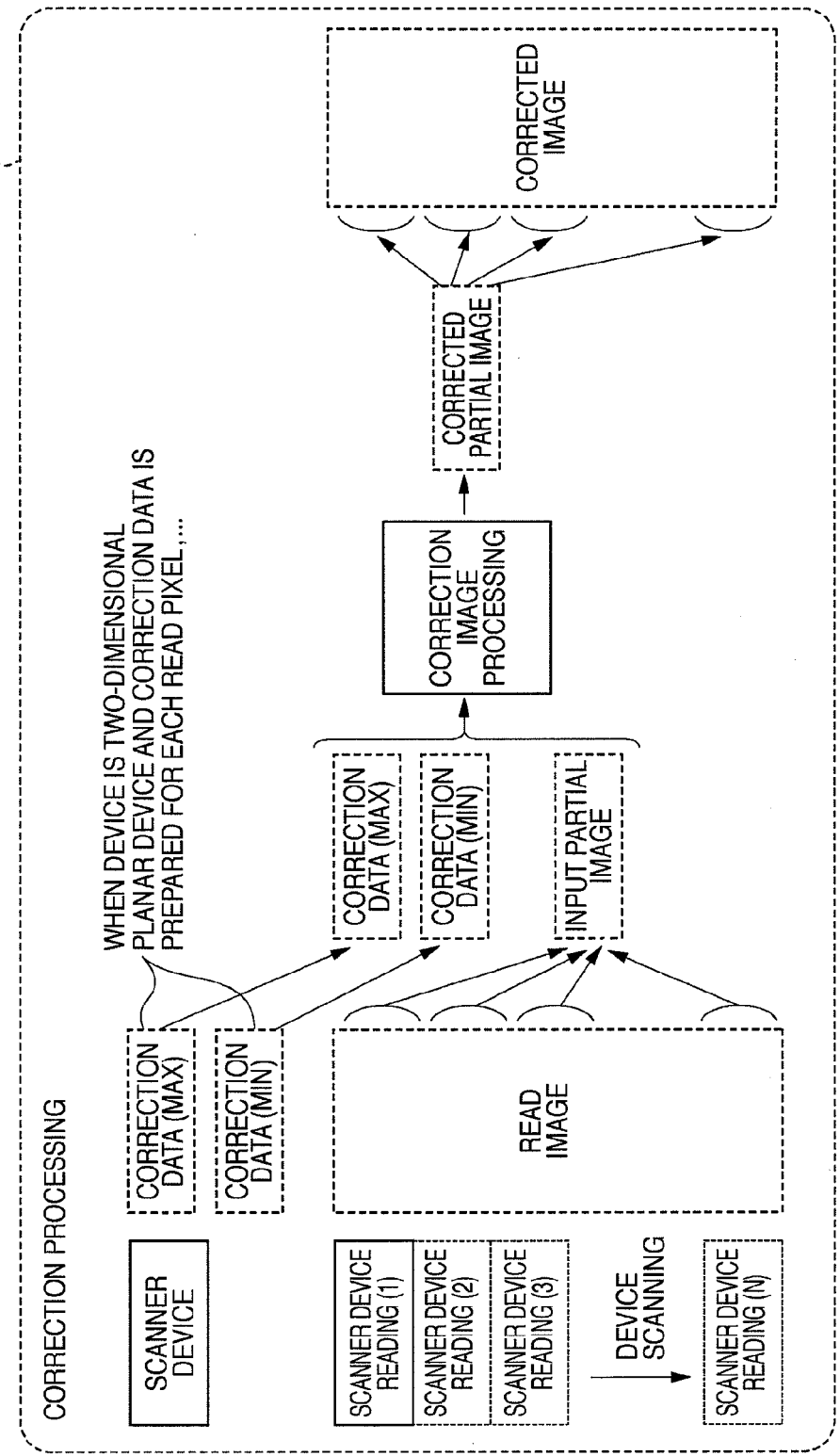

As shown in FIG. 12, the direction of length of the band area is set in accordance with the sub-scanning direction of image data, similar to U.S. Pat. No. 6,587,158. A pixel area 510 falling in the 32-byte unit of the image data format in FIG. 3 is set to one pixel in the main scanning direction and eight pixels in the sub-scanning direction. Even in this case, the first and second embodiments are established.

Figure 10:
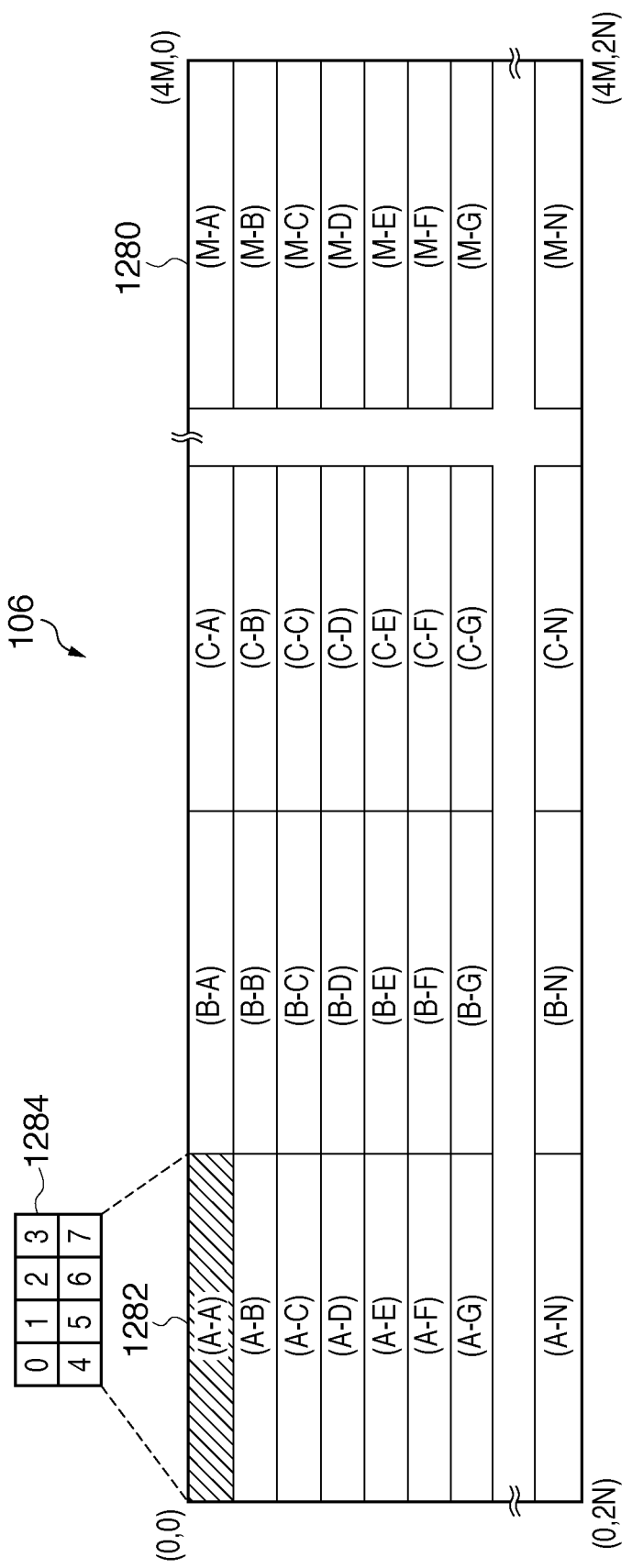
FIG. 10 is a view exemplifying an image data format.
Figure 11:
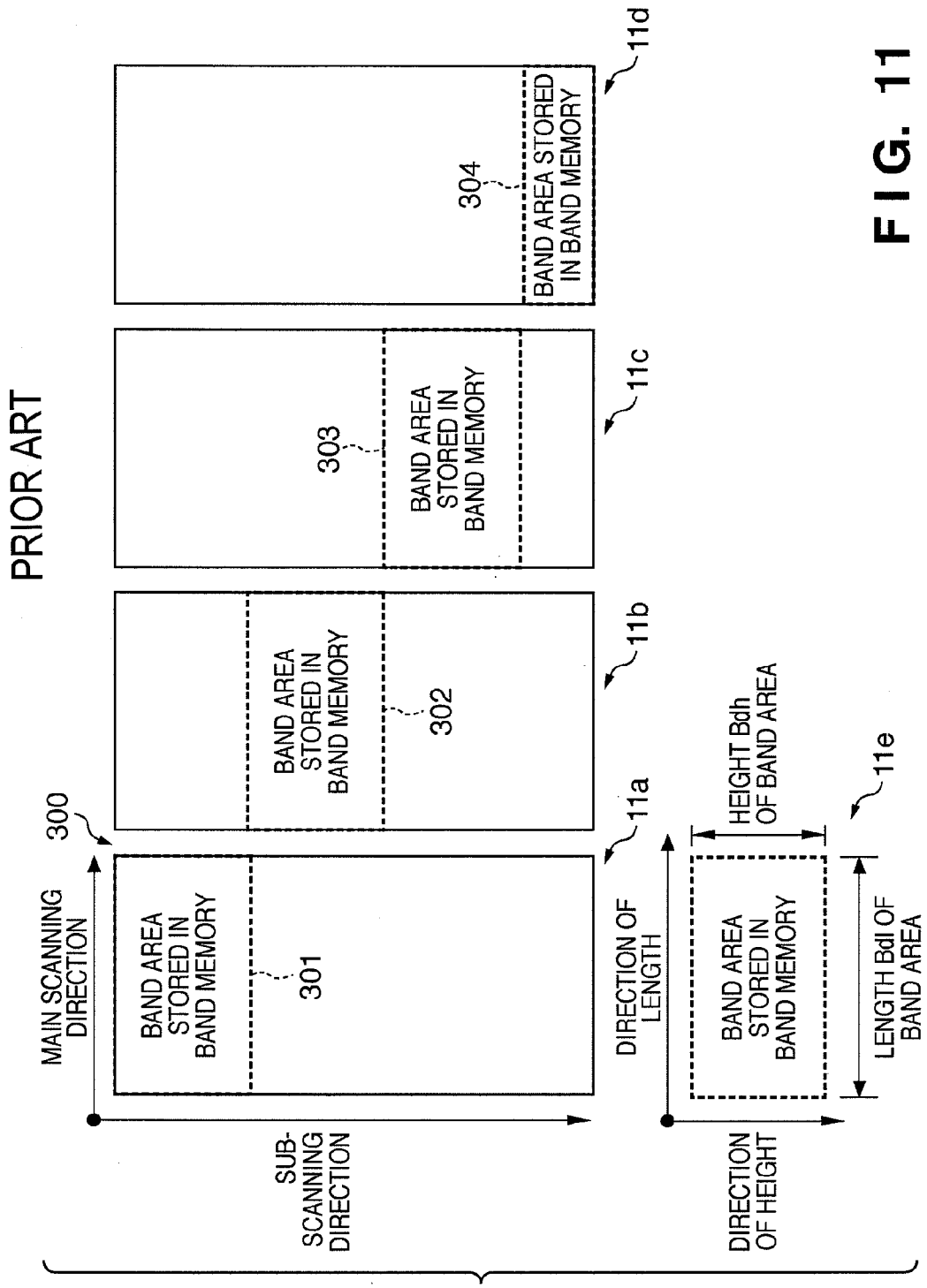
FIG. 11 is a view exemplifying a band processing operation.

Assume that a pixel area 1282 falling in the 32-byte unit is set to four pixels in the main scanning direction and two pixels in the sub-scanning direction, as shown in FIG. 10. In this case, the minimum transfer unit is two lines, and a CPU 102 and DMAC 194 wastefully transfer image data to a shared buffer 660. However, if a sequencer 820 of an image processing input circuit 220 in FIG. 7 can access the shared buffer 660 for every two lines, the first and second embodiments are established.

A plurality of hardware components and a plurality of software components may implement the processes of the above-described embodiments in cooperation with each other. In this case, the processing unit (CPU or processor) of a computer or the like can execute software (program) acquired via a network or various storage media.

The present invention may be achieved by supplying, to a system or apparatus, a storage medium storing a program which causes a computer to implement the functions of the above-described embodiments.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-124720, filed on May 22, 2009, which is hereby incorporated by reference herein in its entirety.

What is claimed is:

1. A method for use in processing an image in a unit of a band area by dividing image data of a target image into a plurality of band areas, when processing image data by referring to reference data, the method comprising the steps of:
    setting a first transfer unit of the image data;
    obtaining a second transfer unit of the reference data to process the image data in the first transfer unit;
    determining a first transfer amount of the image data based on the obtained second transfer unit of the reference data so that both of the image data and the reference data can be buffered in a buffer used in image processing; and
    determining a height of a band area to be generated, based on the first transfer amount and the first transfer unit of the image data.

2. The method according to claim 1, wherein in the step of determining the first transfer amount of the image data, when there is repeat of processing image data in the band area using the reference data, the second transfer unit is calculated in consideration of the repeated image-data-processing operation and then the first transfer amount of the image data is determined using the calculated second transfer unit.

3. The method according to claim 1, further comprising a step of reading out the image data and of the reference data and storing them in the buffer in accordance with the first transfer amount of the image data and a second transfer amount of the reference image data.

4. The method according to claim 3, further comprising the steps of:
    reading out respective pixel groups each including N pixels (where N is an integer equal to or more than 1) successively in a direction of length of the band area to be generated from respective stored data of the image data and the reference data which are stored in the buffer and correspond to a band height; and
    providing an image processing unit with the respective pixel groups, in an order necessary in image processing, the provided respective pixel groups having adding thereto identifiers for distinguishing the image data and the reference data.

5. The method according to claim 4, wherein in the step of reading out, the respective pixel groups are scanned for each pixel in a direction of height of the band area to be generated.

6. The method according to claim 4, wherein in the step of reading, trimming processing is performed in the direction of length of the band area to be generated for the image data and the reference data in accordance with designation of a left end deleting pixel count and a right end deleting pixel count.

7. The method according to claim 6, wherein in the step of reading, pixels are extended at an end for the image data and the reference data after the trimming processing in the direction of length of the band area to be generated, in accordance with designation of an upper end margin pixel count, a lower end margin pixel count, a left end margin pixel count, and a right end margin pixel count.

8. The method according to claim 4, wherein in the step of providing when the N is an integer equal to or more than 2, N pixels of the target image are sequentially provided one by one to the image processing unit.

9. The method according to claim 4, wherein in the step of providing when the N is an integer of at least 2, N pixels of the target image are simultaneously acquired and simultaneously provided to N image processing units.

10. The method according to claim 4, wherein the image processing unit receives image data of the target image, and reference data and distinguishes them in accordance with the identifiers added to respective pixels, and performs image processing.

11. An image processing apparatus for use with the processing of an image in a unit of a band area by dividing image data of a target image into a plurality of band areas, when processing image data by referring to reference data, comprising:
    a setting unit configured to set a first transfer unit of the image data;
    an obtaining unit configured to obtain a second transfer unit of the reference data to process the image data in the first transfer unit;
    a first transfer amount determining unit configured to determine a first transfer amount of the image data based on the obtained second transfer unit of the reference data so that both of the image data and the reference data can be buffered in a buffer used in image processing; and
    a band height calculating unit configured to determine a height of the band area to be generated, based on the first transfer amount and the first transfer unit of the image data.

12. A non-transitory computer-readable storage medium which stores a program causing a computer to execute a method used in processing an image in a unit of a band area by dividing image data of a target image into a plurality of band areas, when processing image data by referring to reference data, the method comprising the steps of:
    setting a first transfer unit of the image data;
    obtaining a second transfer unit of the reference data to process the image data in the first transfer unit;
    determining a first transfer amount of the image data based on the obtained second transfer unit of the reference data so that both of the image data and the reference data can be buffered in a buffer used in image processing; and
    determining a height of the band area to be generated, based on the first transfer amount and the first transfer unit of the image data.

* * * * *